L. L. MACK.
AUTOMATIC CANCELING MACHINE.
APPLICATION FILED OCT. 30, 1912. RENEWED JULY 3, 1914.

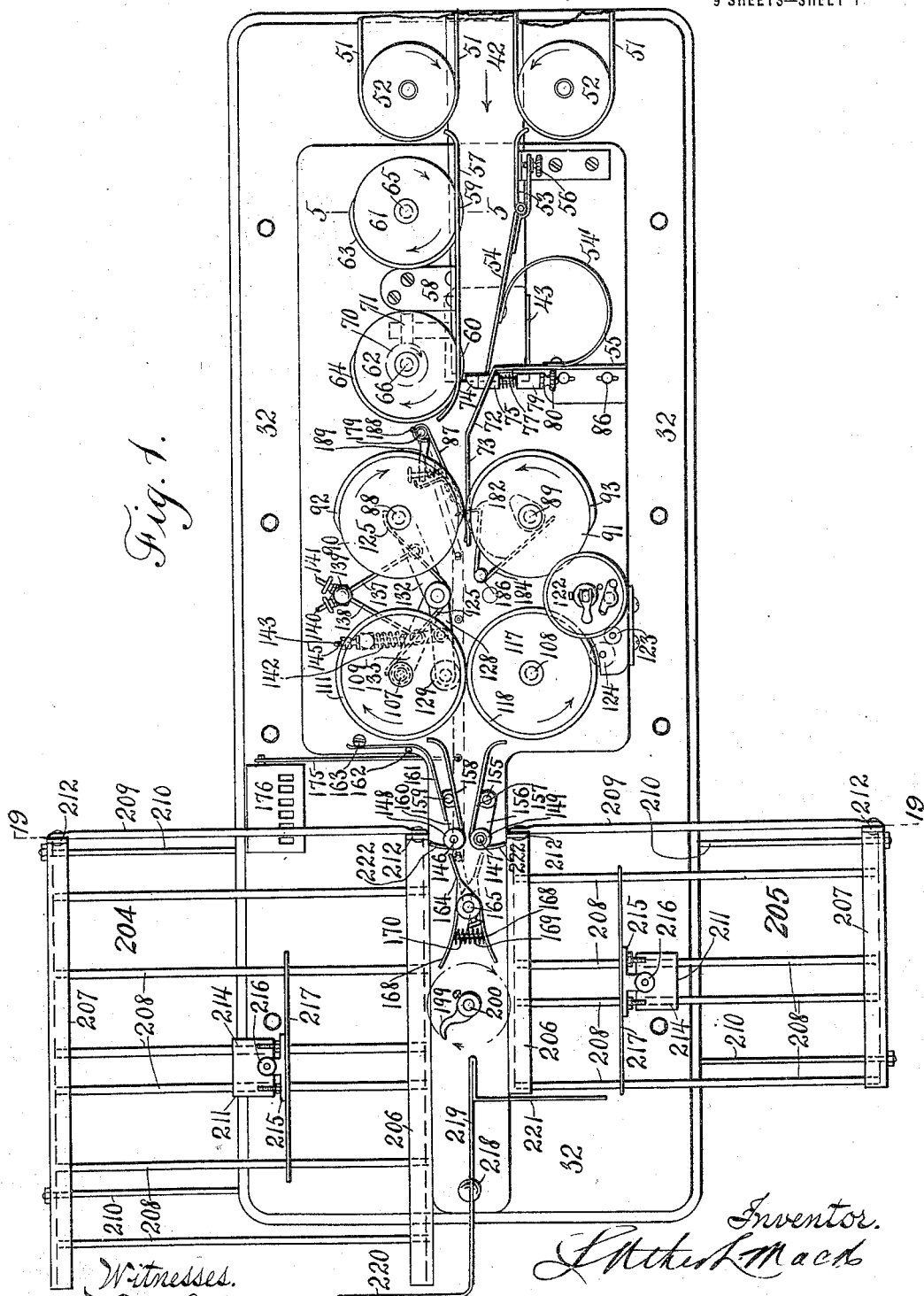

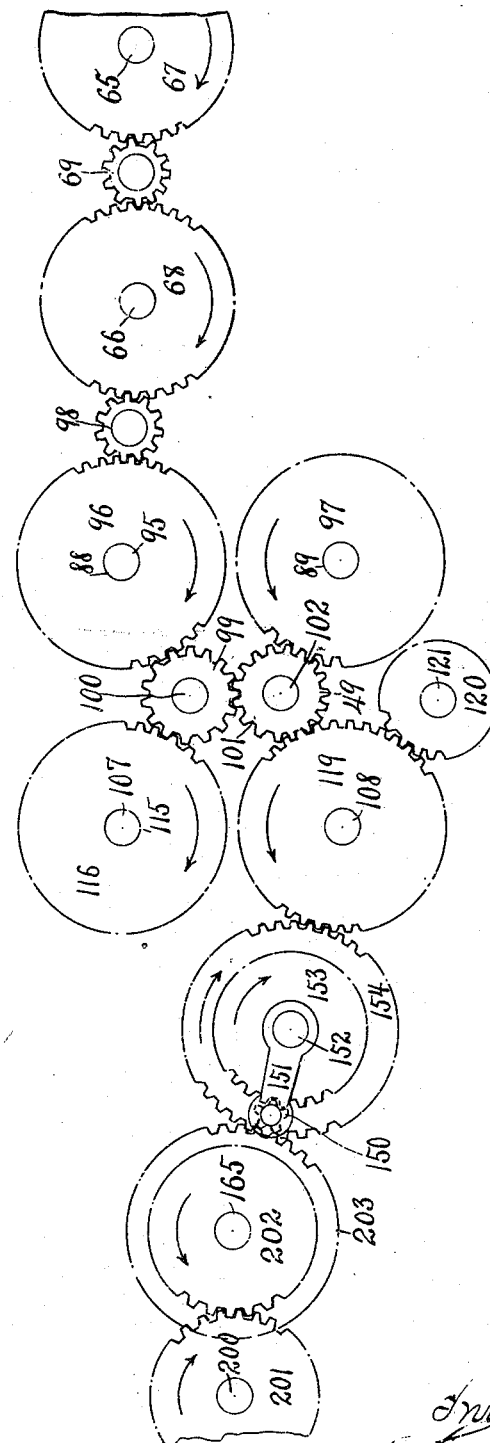

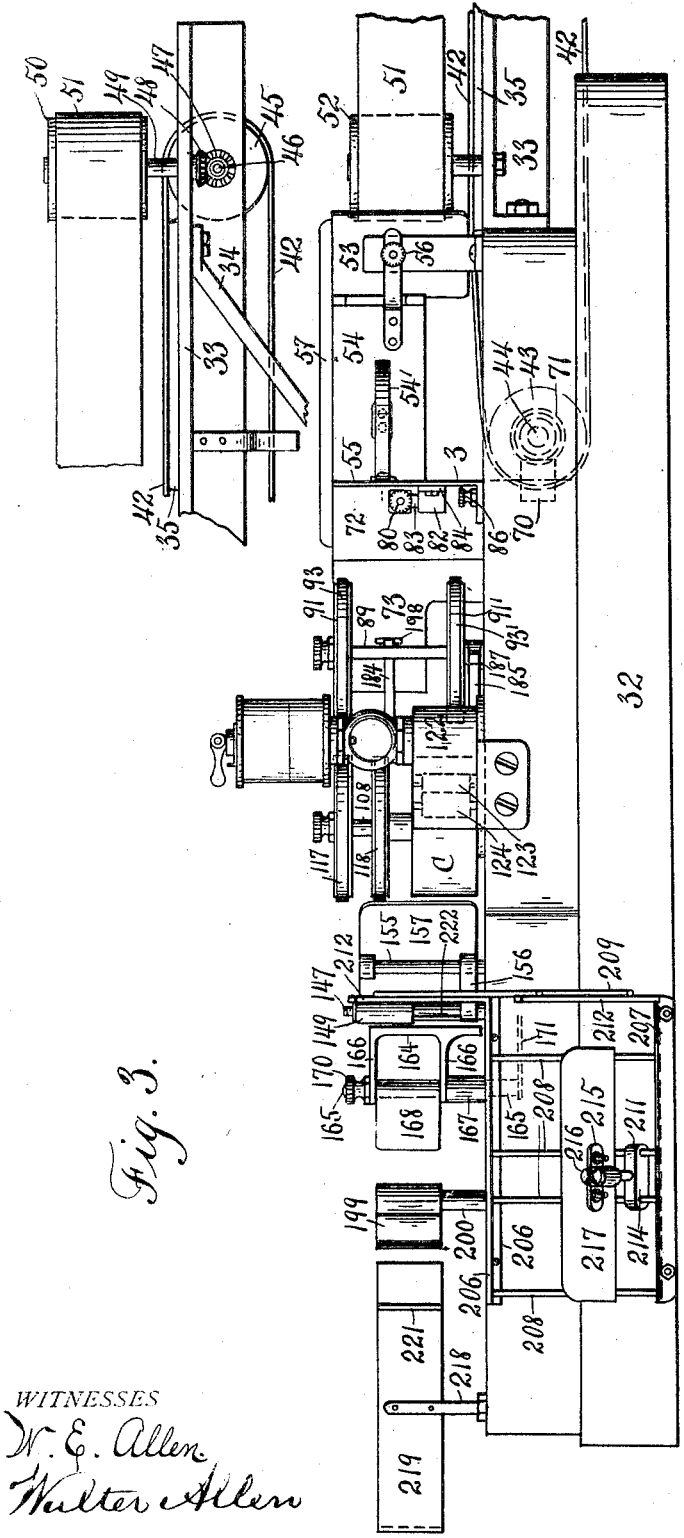

1,228,460.

Patented June 5, 1917.
9 SHEETS—SHEET 4.

WITNESSES
W. E. Allen
Walter Allen

INVENTOR
Luther L. Mack

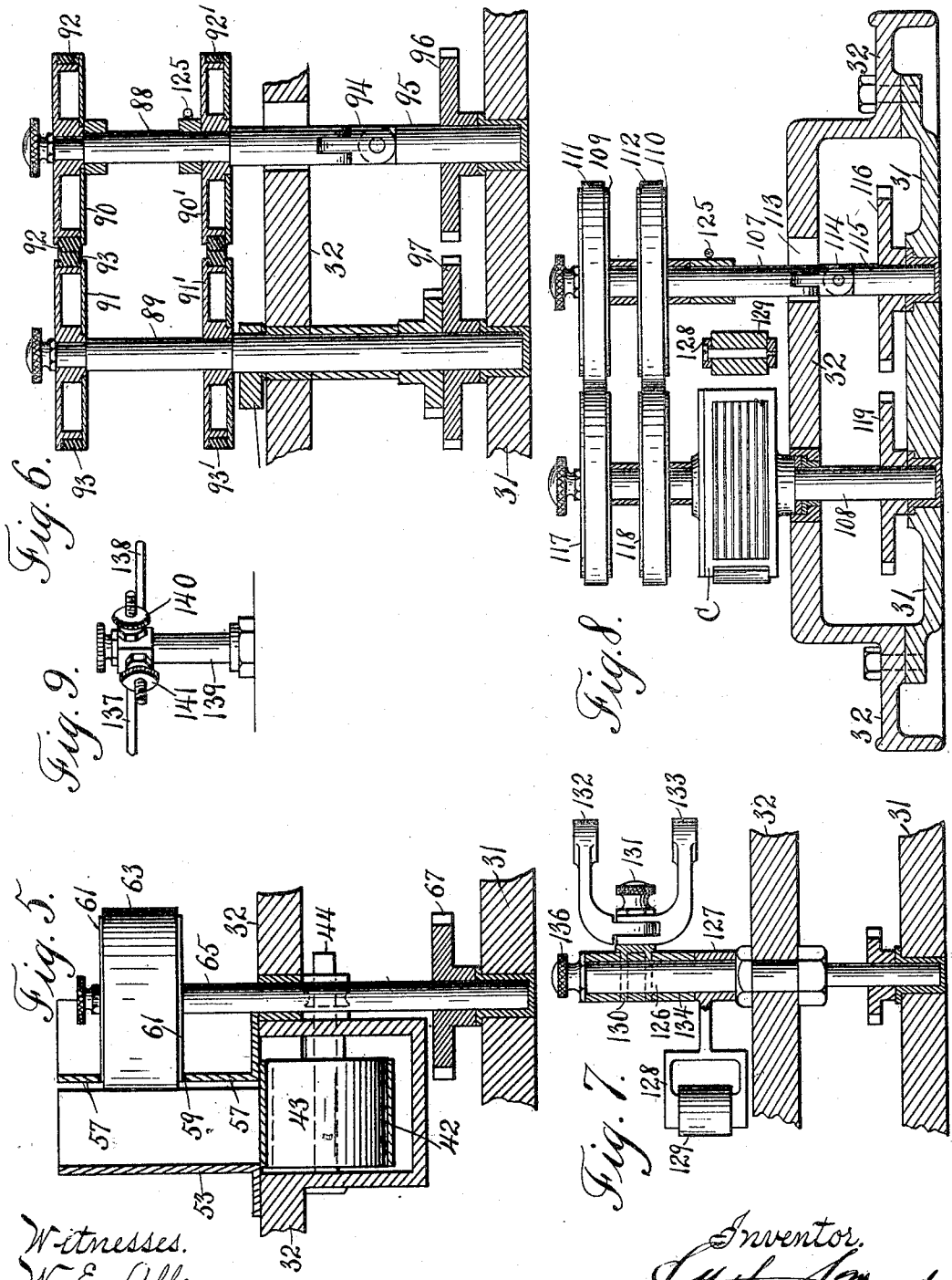

L. L. MACK.
AUTOMATIC CANCELING MACHINE.
APPLICATION FILED OCT. 30, 1912. RENEWED JULY 3, 1914.
1,228,460.
Patented June 5, 1917.
9 SHEETS—SHEET 6.
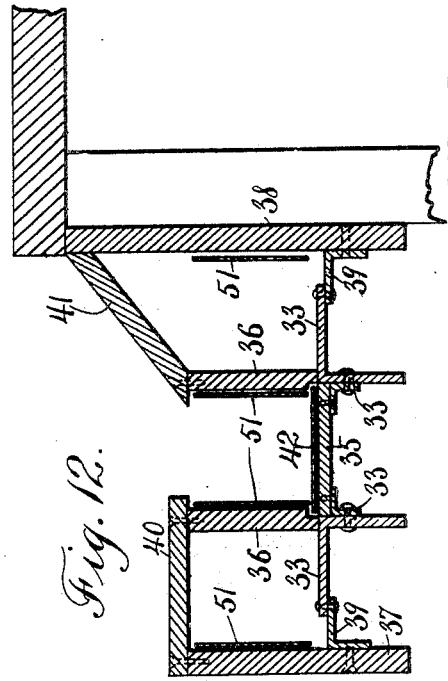
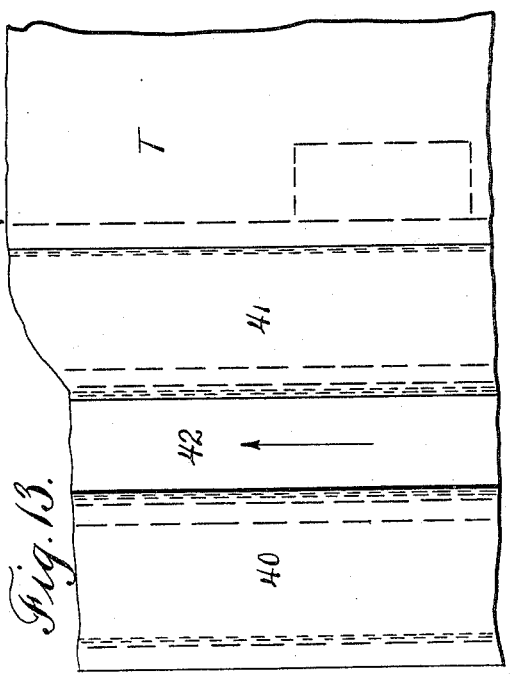
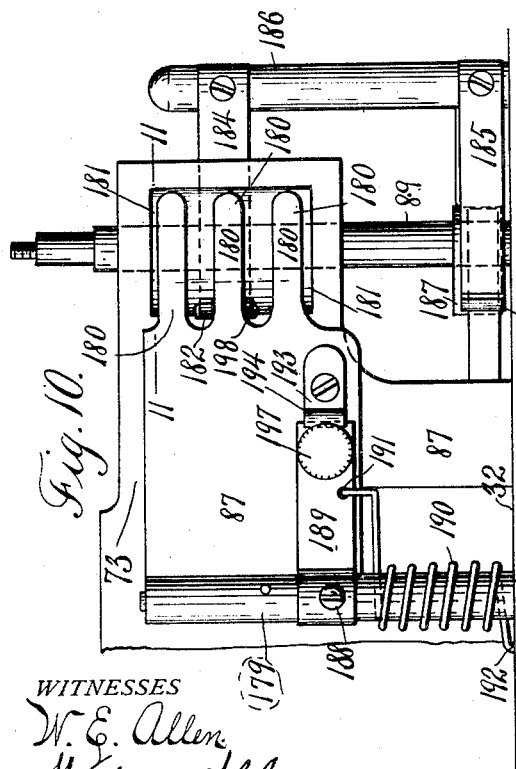
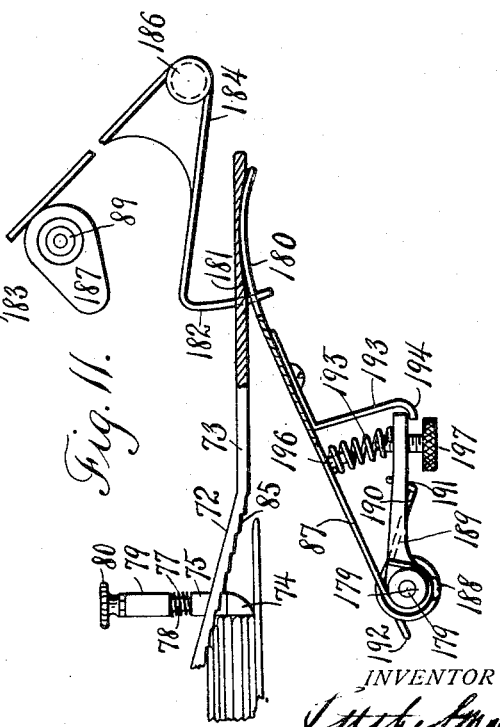
WITNESSES
W. E. Allen
Walter Allen
INVENTOR
L. L. Mack
Attorney L. L. MACK.
AUTOMATIC CANCELING MACHINE.
APPLICATION FILED OCT. 30, 1912. RENEWED JULY 3, 1914.
1,228,460.
Patented June 5, 1917.
9 SHEETS—SHEET 7.
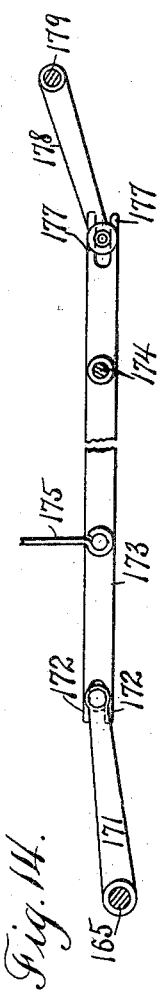
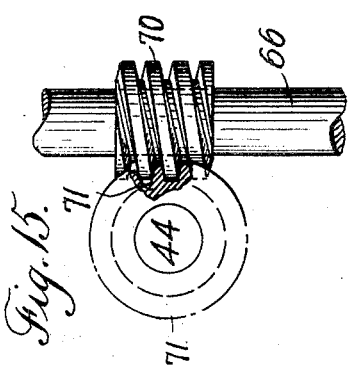
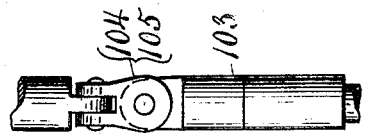

L. L. MACK.
AUTOMATIC CANCELING MACHINE.
APPLICATION FILED OCT. 30, 1912. RENEWED JULY 3, 1914.
1,228,460.
Patented June 5, 1917.
9 SHEETS—SHEET 8.
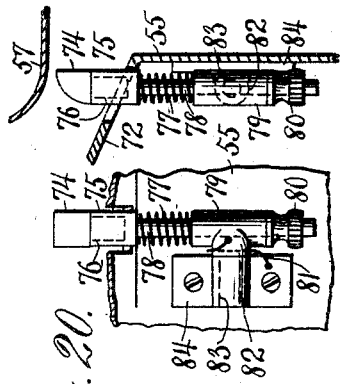
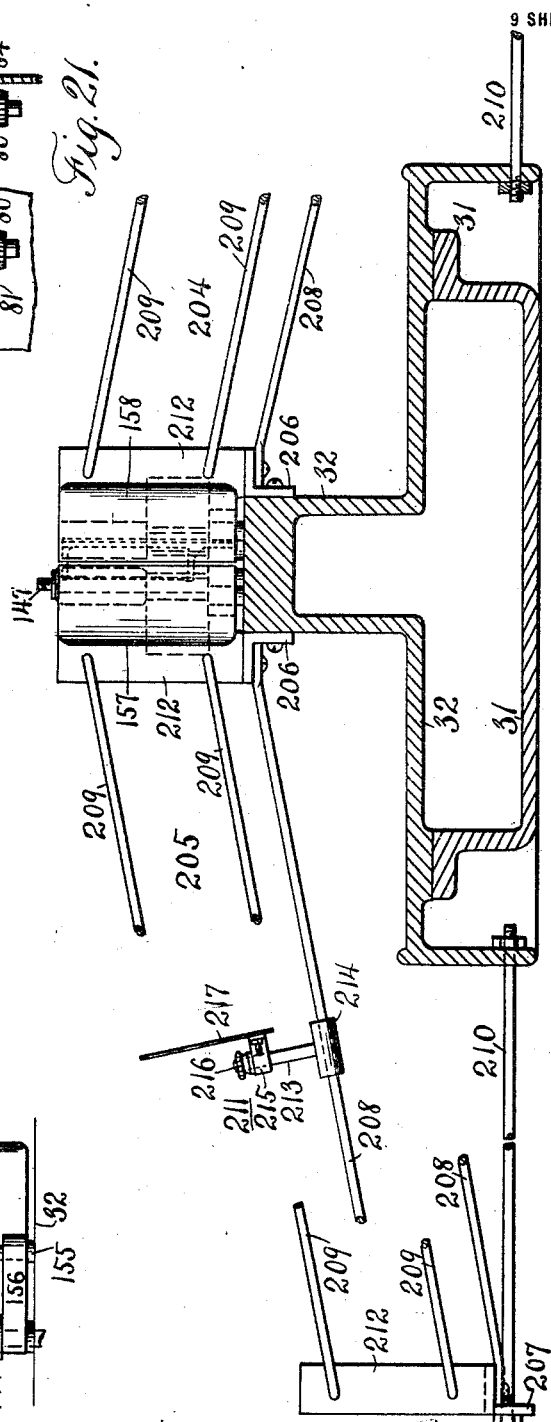
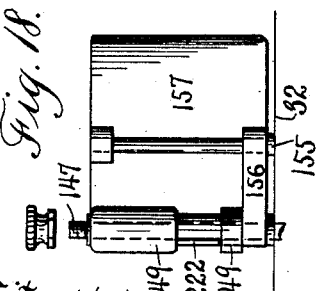
Witnesses.
W. E. Allen
Walter Allen
Inventor.
Luther L. Mack L. L. MACK.
AUTOMATIC CANCELING MACHINE.
APPLICATION FILED OCT. 30, 1912. RENEWED JULY 3, 1914.

1,228,460. Patented June 5, 1917.
9 SHEETS—SHEET 9.

WITNESSES.
Otto G. Steuer
J. E. Bookstaver

INVENTOR.
Luther L. Mack.
By Walter Allen
Attorney

UNITED STATES PATENT OFFICE.

LUTHER L. MACK, OF LOS ANGELES, CALIFORNIA, ASSIGNOR TO CANCELOGRAPH COMPANY, OF LOS ANGELES, CALIFORNIA.

AUTOMATIC CANCELING-MACHINE.

1,228,460.    Specification of Letters Patent.    Patented June 5, 1917.

Application filed October 30, 1912, Serial No. 728,612. Renewed July 3, 1914. Serial No. 848,946.

*To all whom it may concern:*

Be it known that I, LUTHER L. MACK, a citizen of the United States of America, residing at Los Angeles, in the county of Los Angeles and State of California, have invented certain new and useful Improvements in Automatic Canceling-Machines, of which the following is a specification.

My invention relates to improvements in devices for canceling and dating letters, postal cards and like matter, and the object of my invention is—

To provide a small compact automatic device that will receive such matter as is generally received at a post office, canceling the stamp and printing the year, month, day, hour and half hour upon them in the proper position regardless of the length, width or thickness of said matter, and to automatically stack different sized matter separately.

I attain this object by means of the mechanism illustrated in the accompanying drawings, in which—

Figure 1 is a plan view of the machine; only the inner end of the conveying means of the feeding mechanism being shown and the selector lever and connections being shown in dotted lines.

Fig. 2 is a plan view of the gear of the machine.

Fig. 3 is a front elevation of the machine, the stand being omitted, the same figure being continued in the broken view above.

Fig. 4 is a rear elevation of the machine; only the inner end of the conveying means of the feeding mechanism being shown and the stand being omitted.

Fig. 5 is a detail cross section on the line 5—5, Fig. 1.

Fig. 6 is a detail axial section of the forward pair of receiving rollers.

Fig. 7 is a detail section showing a guiding roller and its support.

Fig. 8 is a detail cross section of the after pairs of receiving rollers and adjacent mechanism, the canceler being shown in elevation.

Fig. 9 is a detail elevation of the supporting post for the adjusting device of the yielding or movable roller shafts.

Fig. 10 is an elevation of the selector and timing mechanism.

Fig. 11 is a plan view of the same partly in section.

Fig. 12 is a cross section of the feed trough.

Fig. 13 is a plan view of the same.

Fig. 14 is a plan view of the selector arms and lever.

Fig. 15 is an elevation of the worm gear of the feed mechanism.

Fig. 16 is a side view of the supporting stand showing the motor and driving shaft in position.

Fig. 17 is a detail view of one of the universal joints.

Fig. 18 is a detail view of one of the selector guide plates or rollers.

Fig. 19 is a transverse section about on the line 19—19 of Fig. 1.

Fig. 20 is a detail rear view of the separating finger.

Fig. 21 is a plan view of the separating finger.

Figure 22:
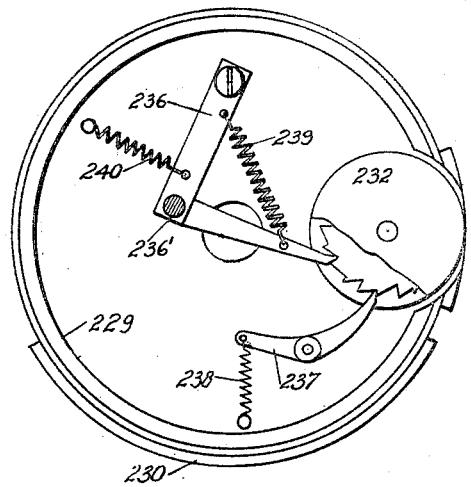
Fig. 22 is a plan view of the canceler partly broken away.
Figure 23:
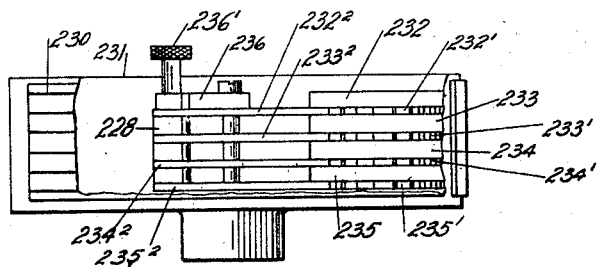
Fig. 23 is a side elevation of the canceler partly broken away.
Figure 24:
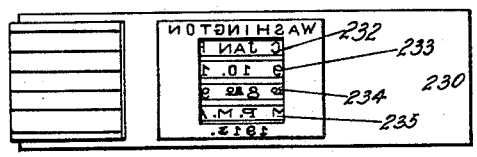
Fig. 24 is a side elevation of the canceler showing the printing face of the printing dies.

My present invention is somewhat similar to the machine described and claimed in my previous application filed February 3, 1912, and serially numbered 675,260, and also to those filed on the same date as that of the present invention Serial Nos. 728,609, 728,610 and 728,611, and includes improvements thereon to be hereinafter described and claimed.

My present invention comprises means for feeding mail or other matter to a postmarking and canceling means, postmarking and canceling means, and separating and stacking means, all of which are mounted on a supporting table, frame or stand, preferably of skeleton iron construction such as the one illustrated in Fig. 16, which has suitable brackets for the support of an electric motor and for switches and other power controlling devices.

The supporting table, frame or stand, comprises four sides A, approximately of the construction shown in Fig. 16, a spider bracket B, for supporting the electric motor M, a plate for supporting a switch box S, and a top casing 31, which serves as the base upon which the bed plate 32 is secured by suitable fastenings, the whole being rigidly secured together by bolts or other fastenings.

The bed plate 32 has preferably a raised middle portion and depending side flanges as illustrated, but the particular construction is not essential, and may be varied in proportions to suit machines built for different speeds of operation or for handling matter of different proportions, as may also the supporting table, frame or stand.

In the machine illustrated in the drawings the mail or other matter, which will be hereinafter referred to as matter, is fed from the right hand end of the machine and stacked at the left hand end of the machine. A left hand machine may be made by a reversal of parts or of the machine as a whole.

Bracketed to the right hand or receiving end of the bed plate 32 is a pair of angle bars 33, forming a foundation for the feeding mechanism as best shown in Figs. 3, 4 and 12. The angle bars are supported and braced at their outer ends by rods 34 (see detached part of Fig. 3). The feeding mechanism comprises a trough formed of a base plate 35, bracketed between the angle bars 33, and the side plates 36. A casing, comprising side pieces 37 and 38, bracketed to the angle bars 33, by angle irons 39, and top pieces 40 and 41, connecting the side pieces 37 and 38 with adjacent side plates 36, forms a protecting means for the automatic conveyers to be hereinafter described. The casing may be fitted against a facing or sorting table T and either or both of the top pieces 40 and 41 may be inclined to a convenient angle to cause the matter deposited thereon to slide into the trough for feeding. The casing may be of any length.

Bottom conveyer belt 42 of suitable fabric is mounted on and operated by a suitable driving pulley 43, mounted on a transverse shaft 44, journaled in the bed plate 32, and passes around a pulley 45, mounted between the angle bars at the opposite end of the feeding mechanism, on the transverse shaft 46. Motion is transmitted from pulley 45, through shaft 46, to bevel gears 47 meshing with bevel gears 48 on a pair of spaced vertical shafts 49, journaled in the horizontal flanges of the angle bars 33, and supporting horizontally revolving pulleys 50, on which the side conveyer belts 51 run, the delivery end of the side belts 51 being supported on idle pulleys 52, suitably mounted on the angle bars 33. The feeding faces of the belts line the trough and the returning belts are inclosed in the case as shown in Fig. 12.

On the top of the right hand end of the bed plate 32 is bracketed a longitudinal guide plate 53 to which is pivotally attached the spring actuated gate 54 controlled by spring 54' mounted on the transverse guide plate 55 as shown in Figs. 1 and 3. The adjustment of the gate 54 is controlled by thumb nut 56.

Facing the longitudinal guide plate 53 is another longitudinal guide plate 57 secured to the bed plate 32 by bracket 58. The longitudinal guide plate 57 is provided with slots 59 and 60 through which a pair of feeding rollers 61 and 62 project, the feeding rollers having eccentrically mounted or segmental projecting faces 63 and 64, formed on their periphery. These feeding rollers 61 and 62 are mounted on shafts 65 and 66 respectively, passing through the bed plate 32 to suitable driving means below, in such a position that the segmental projecting faces 63 and 64 project through the slots 59 and 60 during a portion of the revolution of the feeding rollers only, whereby the matter next to the feeding rollers may be given forward motion.

Above the casing 31 and below the bed plate 32, gears 67 and 68 are fixed on the shafts 65 and 66 respectively. These gears are connected by the intermediate gear 69 so that they move in unison. Shaft 66 also carries a worm 70 engaging a worm gear 71 on the shaft 44, and thus the belts of the feeding mechanism are given motion through pulley 43.

The belts may be run singly or together, the function of the bottom belt being to convey and the function of the side belts being to assist in conveying, to guide, and to prevent congestion of matter. Matter is prevented from getting behind the side belts, which overlap the edges of the bottom belt, by the overhanging edges of the top pieces of the casing.

The guide plate 55 is bent to form one side 72 of a wedge shaped entrance for the matter fed from the feeding rollers 61 and 62, and is also bent to form one side 73 of a straight passage beyond the entrance.

Across the wedge shaped entrance projects the head 74 of a separating finger 75 (see Figs. 1, 3, 20 and 21) the head being secured in a socket 76 in the finger 75 and the finger being advanced by a spring 77 and guided by a shank 78 passing through a sleeve 79 and adjustably secured by a thumb nut 80 beyond the sleeve, which sleeve is held to position by a spring 81, mounted on the vertical supporting sleeve 82 in which fits the vertical stem 83 of the sleeve 79, the supporting sleeve forming part of a bracket 84 for attaching the device to the guide plate 55.

The head 74 of the separating finger 75 may be of rubber or other frictional material. The contacting face is flat and the opposite face rounded. The socket is rectangular and receives the rectangular stem 76 of the head 74. The spring 77 allows a lateral automatic adjustment of the head to the varying thickness of the matter passing through the entrance and the spring 81 allows a forward yielding movement of the entire device, which engages and holds back the next to the passing piece of matter which passing piece is being forwarded by the friction between it and the feeding rollers 61 and 62. The spring-actuated gate 54 exerts a constant pressure on the approaching matter forcing it gently against the feeding rollers 61 and 62 which peel off the piece next adjacent them. The side 72 of the entrance may be stepped as indicated at 85 in Fig. 11, the object of the stepping being to incline the advancing edge of a pack of matter and facilitate the passing of one piece at a time. The transverse guide plate 55 may be made adjustable through suitable fastenings 86 (see Figs. 1 and 3).

Adjacent the side 73 of the straight passage beyond the entrance, and also adjacent a gaging plate 87 inclined diagonally to the side plate 73, is located a pair of vertical shafts 88 and 89, the shafts carrying on their upper ends horizontally revolving positive feeding rollers 90 and 91 having (see Figs. 1 and 6) eccentrically mounted or segmentally projecting friction edges 92 and 93 respectively. In a lower position on the vertical shafts 88 and 89 lower horizontally revolving positive feeding rollers 90' and 91' are mounted and provided with similar friction edges 92' and 93'. The rollers match in pairs and are adapted to give a positive forward movement to matter passing between them. The shaft 88 passes down through an elongated slot in the bed plate and is connected by a universal joint 94 to a short shaft 95 mounted vertically in the casing 31, a driving gear 96 being fixed on the shaft 95. The shaft 89 also passes down through the bed plate and is mounted in the casing 31, a driving gear 97 being fixed on the shaft 89. The gear 96 drives gear 68 through the intermediate gear 98 and thus the feeding mechanism, and is in turn driven by gear 99 on a stub shaft 100 (see Fig. 2) the gear 99 receiving motion from power gear 101 on vertical motor shaft extension 102 connected to the motor shaft 103 through a universal joint 104 and a universal joint 105 and an intermediate shaft 106. Gear 97 is driven direct from the power gear 101.

Beyond the positive feeding rollers is a pair of vertical shafts 107 and 108, shaft 107 having thereon near its upper end a pair of friction rollers 109 and 110 provided with circumferential frictional faces 111 and 112. The shaft 107 passes down through an elongated slot 113 and connects through a universal joint 114 with a short shaft 115 mounted in the casing 31 and having fixed thereon a gear 116 which is driven by gear 99 direct. The shaft 108 carries a pair of friction rollers 117 and 118 matching rollers 109 and 110, and below them the shaft 108 carries a timing and canceling device C of any suitable pattern but preferably like the one designed by me and described in an application filed of even date herewith, Serial No. 728611, as follows:

On the shaft 108 is the canceler shell 229, and upon the outside of the shell is the ring die 230 and the cover plate 231. In this shell are pivoted a stack of printing wheels, 232, 233, 234 and 235, face to face, and having the ratchet wheels 232', 233', 234' and 235', respectively. Upon the periphery of these wheels are respectively dies of months, days, hours, and half hours, and meridian divisions.

The bifurcated spring lever 236 has pivoted between its arms, the block 228 on which are pivoted the spring retained pawls $232^2$, $233^2$, $234^2$, and $235^2$, which pawls are adapted to engage the ratchet wheels.

The set rod 236', to which the pawls are fixed, is slidably adapted to push the pawl to turn the wheels, notch by notch.

The points of the pawls vary in length, and each ratchet except the fourth one has deeper escapement notches of varying depth and varying in number; the hour and half hour wheel 232 having one $\frac{1}{8}$ inch deep, the meridian wheel 233 having every other notch $\frac{3}{32}$ inch deep and the day wheel 234 having one notch $\frac{1}{16}$ inch deep; in order that the shorter pawls may engage and turn the wheels at predetermined periods.

The sliding rod 236' turns the hour and half hour wheel until the pawl $232^2$ drops into the deep recess in the ratchet wheel 232' of the hour wheel 232, when the pawls $233^2$ will engage the ratchet wheel 233' and turn the meridian wheel 233 one point from A. M. to P. M. and likewise in succession, and when the pawl $234^2$ engages the deep recess in its respective ratchet wheel 234' and allows the pawl $235^2$ to engage the ratchet wheel 235' and move it forward one point.

The pawls 237 serve to prevent a backward movement of the wheels. The canceler is rotated by means of the shaft 108 and the gear 119.

The pawl which operates the ratchet on the hour wheel and having the longest tooth, will only move the hour wheel when said pawl falls into the shallowest notch on its ratchet wheel. The hour ratchet wheel has one notch for every half hour of time from 1 to 12:30 inclusive, or 24 notches in all, and one of said notches is $\frac{3}{16}$ of an inch deep while the others are only $\frac{3}{32}$ of an inch deep. Therefore, when the arm 236' is moved the hour pawl which engages one of the shallow notches will move the hour ratchet wheel one point forward, and each time the said arm is moved it will do likewise, and without moving any of the other ratchets. However, when the deep notch in the hour ratchet wheel engages the hour pawl in moving forward, because of the pawl having fallen into the deep notch, it will allow the meridian pawl to fall into engagement with a shallow notch in the meridian ratchet wheel. Likewise, when a deep notch in the meridian ratchet wheel comes into engagement with the meridian pawl it will allow the day pawl to fall into a shallow notch in the day ratchet wheel and move said ratchet wheel one point forward. There is a corresponding number of notches in each of the ratchet wheels to the number of points on the periphery of the printing member, and when one of said members is at zero it will repeat the numbers or characters.

The shaft 108 passes down through the bed plate 32 and is mounted on the casing 31 and has fixed thereon a gear 119 receiving power direct from the power gear 101 and transmitting power through gear 120 and shaft 121 to an inker 122 of any suitable pattern but preferably of the construction designed by me and shown in an application filed of even date herewith Serial No. 728,610, the ink being preferably fed by contact through a hard roller 123 and a soft roller 124 to the timing and canceling device. The rollers 90, 90', 109 and 110 are held to contact with rollers 91, 91', 117 and 118 by spring 125 the middle of the spring resting against or secured to a sleeve on post 126 and the ends of the spring resting against a sleeve on each of the shafts 88 and 107. The post 126 also has mounted thereon sleeve 127 carrying a pressure roller bracket 128 supporting a pressure roller 129, bracket 130 having adjustably and removably secured to it by a thumb nut 131 a pair of alining arms 132 and 133 designed to be mounted on and to steady the shaft 88, bracket 134 carrying arm 135 to do similar service for shaft 107 and a nut 136 to retain the parts on the post. The arms 133 and 135 are adjusted by means of rods 137 and 138 secured to the arms at one end, the other ends passing through a post 139 and secured by screw nuts 140 and 141.

The pressure roller is held to its work through its bracket 128 by a spring 142 mounted on a rod 143 connected at one end to the bracket 128 and having its other end passed through a post 144 and adjustably secured by a thumb nut 145.

Beyond the friction rollers and the timing and canceling device is positioned a pair of shafts 146 and 147 carrying friction guide rollers 148 and 149, the rollers 148 being idle rollers receiving motion by friction from the rollers 149 through matter passing between them and the roller 149 being driven through its shaft by a small gear 150 mounted in a bracket arm 151 loosely pivoted on shaft 152 and driven through a gear 153 fixed on the shaft 152, the shaft receiving motion through gear 154 from gear 119. A stud 155 in the bed plate is a pivot for the guide plate mounting 156 carrying guide plate 157 bent around into the extensions 222. A similar guide plate 158 is pivotally mounted on a stud 159 with a similar extension 222. The mountings of the guide plates are sleeved on the shafts 146 and 147 so as to follow them in their movement. The mounting 160 of the guide plate 158 has bearing against it a spring 161 bent around pin 162 and secured to stud 163 on the bed plate, the spring serving to hold the friction guide rollers 148 to their work.

Beyond the friction guide rollers and on the center line of the bed plate is the skeleton separator 164 rigidly mounted on the pivoted post 165 through its backwardly extending arms 166, spaced from the bed plate 32 by a sleeve 167, carrying between its arms the backward extending flaring wings 168 resiliently braced by the spring 169, and secured on the post by a thumb nut 170.

The post 165 extends down through the bed plate and is mounted below the top thereof. It is oscillated through a lever 171 fixed to its lower end (see Fig. 14). The free end of the lever 171 has a sliding bearing between the forked end 172 of a rocking lever 173, pivoted at 174 on the underside of the bed plate 32, and having the operating rod 175 of a counter 176 connected to it at a convenient point. The opposite forked end 177 of the rocking lever has a sliding bearing for an operating lever 178 controlled by the oscillating movement of a vertical shaft 179 mounted in the bed plate 32 beneath the underside and passing up through the bed plate at a point between the feeding roller 62 and the positive feeding rollers 90 and 90'.

On this shaft 179 is loosely mounted the gaging plate 87 heretofore mentioned (shown in detail in Figs. 10 and 11), having curved fingers 180 adapted to rest in the hollow 181 in the adjacent face of the part 73 of the guide plate 55, and thereby, in conjunction with the curved ends 182 and 183 of stop arms 184 and 185, rigidly mounted on pivoted post 186 and operated by cam 187 rotating with shaft 89, closing the way against the passage of matter at regular intervals, punctuated by the projection and withdrawal of the curved ends 182 and 183.

Secured to the shaft 179 by a screw 188 is an arm 189 pressed toward the center line of the bed plate by a spring 190 attached to the arm at 191 and to the bed plate at 192. The gaging plate 87 carries a bracket 193 having a hooked end 194 limiting the distance between the outer end of the arm 189 and the gaging plate 87. A spring 195 between the outer end of the arm 189 and a pin 196 on the plate 87 tends to press apart the arm and the gaging plate, the tension being adjusted by the adjusting thumb screw 197 in the outer end of the arm. By this means the fingers 180 are held in contact with the curved hollow 181 under sufficient pressure to cause operation of the skeleton separator at the other end of the chain of levers, with the passage of a thin letter and yet may separate a sufficient distance from the side plate 73 to allow the passage of a thick letter by contracting the spring 195, the movement of the skeleton separator being limited to the same arc in each. While it is not material at what point the curved ends 182 and 183 of the stop arms 184 and 185 block the passage, it is preferable to have the latter end near the bed plate and the former end at a point about opposite the middle one of the fingers 180, the curved end 182 passing through a slot 198 in the side plate 73 and bifurcated to pass above and below the middle finger. The present arrangement appears to tend less to buckle or crimp the matter passing through, the important point being the interlocking of fingers, with one set approximately perpendicular to the line of travel.

By this mechanism a piece of matter will be stopped by the interlocking fingers and then allowed to pass, the separating of the fingers 180 from the hollow 181 by the passage of the matter causing a movement of the levers and the skeleton separator, which will move from its normal position in the rear of one guide roller (as shown in full lines in Fig. 1) to a position behind the opposite guide roller (as shown in dotted lines in Fig. 1). If the matter is a long one, the forward end of it will have passed the skeleton separator before the rear end of it will have passed from between the curved fingers and the side plate 73 and it will pass into the receptacle for long matter. If the matter is a short piece the forward end will not reach the skeleton separator until the rear end has passed from between the curved fingers and the side plate 73, and the curved fingers and side plate 73, the levers, and the skeleton separator will have returned to normal position by the time the matter reaches the skeleton separator and the matter will be directed into the receptacle for short matter.

Beyond the skeleton separator is a revolving pusher 199 on a vertical shaft 200 passing down through the bed plate and mounted in the casing 31. This shaft carries a gear 201 operated through gears 202 and 203, loosely mounted on the post 165 or mounted on a short post in the bed plate, by a gear 154, the pusher preferably revolving at a higher rate of speed, and serving to push back the piles of separated matter on either side so that the addition of new matter will not cause a congestion.

At either or both sides of the machine, about this point, are mounted the stackers 204 and 205, they being secured to the bed plate 32 and comprising horizontal brackets 206 and 207 having the upwardly projecting ends 212, the longitudinal bottom pieces 208, on two of which are slidably mounted the follower heads 211, longitudinal side pieces 209, and the brace rods 210. The ends of the longitudinal bottom pieces are secured to the brackets 206 and 207 forming a base, the longitudinal side pieces are secured to upturned ends 212 of the brackets, the brackets 206 being fastened to the upper middle portion of the bed plate 32 and the brackets 207 being braced outward from the bed plate and supported by the brace rods 210, secured to them and to the bed plate.

The sliding retainers or cheeks 211 have a base piece 214 sliding on two adjacent rods or pieces 208, an upwardly extending post 213, having mounted thereon a bracket 215, secured on the post by a thumb nut 216, and carrying a plate 217, against which the canceled and postmarked separated matter lies.

To the rear of the stackers is set a post 218 carrying a plate bent to form a dividing wall 219 and back stops 220 and 221 to stop the matter in its forward movement. To prevent rebounding of the matter the guide plates 157 and 158 are provided with curved tail pieces which cover the openings between the ends of the stackers and the guide rollers.

The segmental projections 63, 64, 92 and 93 may be either formed on the rollers or may be produced by attaching to or encircling them with pieces or rings of rubber or other frictional material. The eccentricity of the periphery of the rollers causes a quick but gradual application of the grip on the matter, whether it be thick or thin and causes it to be carried forward to the timing and canceling mechanism in the proper time. The revolutions of the different rollers, and especially the rollers operated by gears 96, 97, 116 and 119, are in unison, the said gears being of the same size, so that the timing and canceling marks are bound to appear in the same place on each piece of matter passed through the machine.

The lower friction rollers are important to keep the matter in horizontal position as it passes through the machine as without them there is a tendency to "throw" the letters upward, and they should be set to grip the matter at the same time that the upper rollers grip it.

The curved fingers 180 may be made either integral with or separate from the gaging plate 87 and may be strengthened by a rib if the plate 87 is of thin material. It is important that the plates 55, 72, 73, and 87 should be absolutely stiff when operating the machine at high speeds.

The swinging gate or presser plate 54 should be adapted to hold a piece of matter firmly against the rollers 61 and 62 when the segmental portions 63 and 64 are projected through the guide plate 57, thus making sufficient friction between the matter and the surfaces of segmental portions 63 and 64 to forward the matter next to the rollers but retarding the pieces not in actual contact with the rollers.

The pressure roller 129 is not in contact with the canceling surface at any time but is adjusted to just clear it, being close enough so that matter passing between the roller and the canceler will be held against the canceler. No ink therefore can get on the back of the matter as it passes through.

The operation is as follows:

The matter is placed either singly or *en masse* in the trough on the feeding belt 42, which, with or without the assistance of the side belts 51, passes the matter to the feeding rollers 61 and 62, which, with the assistance of the presser plate 54 and the separating finger 75, pass the matter in single file to the interlocking fingers 180, 182 and 183, which set and control the headway and release the matter periodically to the positive feeding rollers 90 and 91, the segmental projections 92 and 93 of which engage the matter and push it forward to the friction rollers 109, 110, 117 and 118, the pressure roller 129 and the timing and canceling device C, by which latter it is marked. It then passes between the guide plates 157 and 158 and guide rollers 148 and 149, is switched to one side or the other by the skeleton separator, assisted by the flaring wings 168, and the rotating pusher 199, to the proper receptacle, the pusher 199, preparing a place for it by pressing back the matter which is already in the stackers.

What I claim as my invention and desire Letters Patent for, is—

1. In a mail marking machine having means for assorting mail matter with regard to length, the combination of a rotary printing member secured to a shaft journaled in a suitable bed plate, a set of continuously contacting forwarding rollers for advancing mail matter of various length, width and thickness by said printing member, a set of intermittently contacting rollers adapted to receive at regular intervals and advance said matter one piece at a time to said forwarding rollers, a regulating and timing arm normally across the path of said matter adapted to stop the matter in its passage and release it after a certain period of time in order to register with the die on said printing member, one or more feed rollers having an intermittently acting frictional surface for feeding said matter to said receiving rollers, conveyer means for delivering said matter from a facing table to said feed rollers, means for holding said matter firmly in contact with said feed rollers, means for separating said matter piece by piece, and driving means.

2. In a mail marking machine having means for assorting mail matter with regard to length, the combination of a rotary printing member secured to a shaft journaled in a suitable bed plate, a set of continuously contacting forwarding rollers for advancing mail matter of various length, width and thickness by said printing member, a set of intermittently contacting rollers adapted to receive at regular intervals and advance said matter one piece at a time to said forwarding rollers, a regulating and timing arm normally across the path of said matter adapted to stop the matter in its passage and release it after a certain period of time in order to register with the die on said printing member, one or more feed rollers having an intermittently acting frictional surface for feeding said matter to said receiving rollers, conveyer means for delivering said matter from a facing table to said feed rollers, means for holding said matter firmly in contact with said feed rollers, means for separating said matter, piece by piece as it is delivered to said receiving rollers by said feed rollers, a feed receptacle opposite said feed rollers for holding said matter while it is being separated and fed, and driving means.

3. In a mail marking machine having means for assorting mail matter with regard to length, the combination of a rotary printing member secured to a shaft journaled in a suitable bed plate, a set of continuously contacting forwarding rollers for advancing mail matter of various length, width and thickness by said printing member, a set of intermittently contacting rollers adapted to receive at regular intervals and advance said matter one piece at a time to said forwarding rollers, a regulating and timing arm normally across the path of said matter adapted to stop the matter in its passage and release it after a certain period of time in order to register with the die on said printing member, means for operating said timing arm, one or more feed rollers having an intermittently acting frictional surface for feeding said matter to said receiving rollers, conveyer means for delivering said matter from a facing table to said feed rollers, means for holding said matter firmly in contact with said feed rollers, a feed receptacle opposite said feed rollers for holding said matter while it is being fed, means for separating said matter piece by piece as it is delivered to said receiving rollers by said feed rollers, and driving means.

4. In a mail marking machine having means for assorting mail matter with regard to length, the combination of a rotary printing member secured to a shaft journaled in a suitable bed plate, means for supplying ink to said printing member, a set of continuously contacting forwarding rollers for advancing mail matter of various length, width and thickness by said print-forwarding rollers, a set of intermittently contacting receiving rollers, feed rollers having intermittently acting frictional surfaces, a rotary stacking deflector, timing means operable at each revolution of said rollers, conveyer means for delivering mail matter from a facing table to the feed rollers, and means for assorting said matter with regard to length.

11. A mail marking machine having in synchronous rotation a rotary printing member, a set of continuously contacting forwarding rollers, a set of intermittently contacting receiving rollers, feed rollers having intermittently acting frictional surfaces, a rotary stacking deflector, timing means operable at each revolution of said rollers, means for assorting said matter with regard to length, and means for stacking matter of different length in separate receptacles, and conveyer means for delivering mail matter from a facing table to the feed rollers.

12. A mail marking machine having in synchronous rotation a rotary printing member, a set of continuously contacting forwarding rollers, a set of intermittently contacting receiving rollers, feed rollers having intermittently acting frictional surfaces, a rotary stacking deflector, timing means operable at each revolution of said rollers, conveyer means for delivering mail matter from a facing table to the feed rollers, means for assorting said matter with regard to length, means for stacking matter of different length in separate receptacles, and means for supplying ink to said printing member.

13. A mail marking machine having a single conveyer passage, the bottom and two of the sides thereof being formed by three uniformly operated belts for delivering mail matter of various length, width and thickness from a facing table in bulk to a feeding means adapted to gradually and intermittently, in regular succession grip and advance one piece of said matter at a time to a receiving means, means for regulating and timing the delivery of said matter to the receiving means, receiving means adapted to gradually and intermittently apply pressure to said matter, forwarding means, rotary printing means and means for supplying ink to said printing means, said feed means, receiving means, timing means, said printing means and forwarding means being in synchronous relation with regard to their rotation and operation and thereby adapted to feed into and forward through the machine and print and cancel an equal number of pieces of long or short matter in a given length of time.

14. A mail marking machine having a single conveyer passage, the bottom and two of the sides thereof being formed by three uniformly operated belts for delivering mail matter of various length, width and thickness from a facing table in bulk to a feeding means adapted to gradually and intermittently, in regular succession grip and advance one piece of said matter at a time to a receiving means, means for regulating and timing the delivery of said matter to the receiving means, receiving means adapted to gradually and intermittently apply pressure to said matter, a vertical face plate secured to a suitable bed plate and having longitudinally disposed slots through which said feeding means is adapted to project once in each revolution thereof, means for holding said matter firmly in contact with said feeding means, forwarding means, rotary printing means and means for supplying ink to said printing means, said feed means, receiving means, timing means, printing means and forwarding means being in synchronous relation with regard to their rotation and operation and thereby adapted to feed into and forward through the machine and print and cancel an equal number of pieces of long or short matter in a given length of time.

15. In an automatic mail marking machine, a resilient finger pivotally mounted on the bed plate and adapted to lie normally across the path of and to bear upon mail matter passing through the machine, a co-acting arm pivotally mounted beneath the bed plate having a common axis with said finger, a pin in the outer end of said arm, a notched lever pivotally mounted beneath the bed plate forward of its center lying normally beneath the path of the mail matter, the notch in the forward end thereof being adapted to engage the pin in said arm, a gate pivotally mounted on the bed plate and in the path of said matter, an arm pivotally mounted beneath the bed plate having a common axis with said gate and having a pin in the outer end thereof adapted to engage the notch in the other end of said lever, said gate and said finger being adjusted to face each other and the distance therebetween being so determined that a short letter may emerge from under said finger before reaching said gate, said gate being adapted to swing to the right or left in order to allow the passage of long and short letters to separate receptacles and said finger being adapted to hold said gate open to the long letter stacking receptacle until the long letter has reached said receptacle, means for feeding said matter into the machine, means to print said matter in its passage, means for stacking said matter after having been printed, and motor means for operating the machine.

16. In an automatic mail marking maing member, a set of intermittently contacting rollers adapted to receive at regular intervals and advance said matter one piece at a time to said forwarding rollers, a regulating and timing arm normally across the path of said matter adapted to stop the matter in its passage and release it after a certain period of time in order to register with a die on said printing member, means for operating said timing arm, one or more feed rollers having an intermittently acting frictional surface for feeding said matter to said receiving rollers, conveyer means for delivering said matter from a facing table to said feed rollers, means for holding said matter firmly in contact with said feed rollers, a feed receptacle opposite said feed rollers for holding said matter while it is being fed, means for separating said matter piece by piece as it is delivered to said receiving rollers by said feed rollers, and driving means.

5. In a mail marking machine having means for assorting mail matter with regard to length, the combination of a vertical face plate secured to a suitable bed plate having longitudinally disposed slots in its face, one or more feed rollers having an intermittently acting frictional surface adapted to project through said slots once in each revolution thereof, yielding means for holding said matter firmly in contact with the frictional surface of said feed rollers, conveyer means for delivering said matter from a facing table to said feed rollers, means for separating said matter, means for guiding the matter so separated into the machine, a set of intermittently contacting receiving rollers having their contacting surfaces in the path of said mail matter, a rotary printing member for printing the day, hour, month and year and for canceling a stamp on said matter, the periphery of said printing member being also in the path of said mail matter, and timing means interposed between the receiving rollers adapted to stop and hold a piece of matter a certain period of time and release it so that it will register with said printing means.

6. In a mail marking machine having means for assorting mail matter with regard to length, the combination of a vertical face plate secured to a suitable bed plate having longitudinally disposed slots in its face, one or more feed rollers having an intermittently acting frictional surface adapted to project through said slots once in each revolution thereof, yielding means for holding said matter firmly in contact with the frictional surface of said feed rollers, conveyer means for delivering said matter from a facing table to said feed rollers, means for separating said matter, means for guiding the matter so separated into the machine, a set of intermittently contacting receiving rollers having their contacting surfaces in the path of the mail matter, a rotary printing member for printing the day, hour, month and year and for canceling a stamp on said matter, the periphery of said printing member being also in the path of said mail matter, means for supplying ink to said printing member, and timing means interposed between the receiving rollers adapted to stop and hold a piece of matter and release it after a certain period of time so that it will register with said printing member.

7. A mail marking machine having in synchronous rotation and operation a rotary printing member for printing the day, hour, month and year and canceling a stamp on mail matter, a set of continuously contacting forwarding rollers, a set of intermittently contacting receiving rollers, and one or more feed rollers having intermittently acting frictional surfaces for regularly and successively advancing said matter to said receiving rollers, one at a time, a rotary stacking deflector and means for stacking said matter in separate receptacles with regard to length.

8. A mail marking machine having in synchronous rotation and operation a rotary printing member for printing the day, hour, month and year and canceling a stamp on mail matter, a set of continuously contacting forwarding rollers, a set of intermittently contacting receiving rollers, and one or more feed rollers having intermittently acting frictional surfaces for regularly and successively advancing said matter to said receiving rollers, one at a time, and a rotary stacking deflector, in combination with conveyer means for delivering mail matter from a facing table to said feed rollers, and means for stacking said matter in separate receptacles with regard to length.

9. A mail marking machine having in synchronous rotation and operation a rotary printing member for printing the day, hour, month and year and canceling a stamp on mail matter, a set of continuously contacting forwarding rollers, a set of intermittently contacting receiving rollers, and one or more feed rollers having intermittently acting frictional surfaces for regularly and successively advancing said matter to said receiving rollers, one at a time, a rotary stacking deflector, and means for timing said matter in its passage through the machine, in combination with conveyer means for delivering mail matter from a facing table to said feed rollers and means for stacking said matter in separate receptacles with regard to length.

10. A mail marking machine having in synchronous rotation a rotary printing member, a set of continuously contacting chine, the combination with a frame, means on the frame for feeding and receiving mail matter of varying length and thickness and advancing it to a suitable canceler, means for printing and canceling said matter, and means for applying motive power to the other means, of means for automatically assorting the canceled matter relative to length, and means for stacking said matter in separate stacking receptacles.

17. In an automatic mail marking machine, the combination with a frame, means on the frame for feeding and receiving mail matter of varying length and thickness and advancing it to a suitable canceler, means for canceling said matter, means for selectively assorting and stacking the canceled matter, and means for applying motive power to the other means, and conveyer means co-acting with the feeding means on the frame for conveying mail matter from a facing table to said feeding means.

18. In an automatic mail marking machine, the combination with a frame, canceling means on the frame, means on the frame for receiving mail matter of varying length and thickness and advancing said matter to the canceler, and means for applying motive power to the other means, of a post pivoted in the bed plate, a skeleton selector rigidly mounted on said post and facing the moving canceled matter and being provided with resilient outwardly extending arms back of said post, and means to throw said selector gate to the right or left relative to the approach of long or short pieces of mail matter.

19. In a mail marking machine, the combination with the means for intermittently and regularly feeding the mail matter successively, one piece at a time and means for printing the time and canceling the stamp thereon, of means coöperating therewith for automatically determining the disposition of the said matter subsequent to the printing operation, selectively relative to the length of the pieces of matter and for stacking said matter in separate receptacles.

LUTHER L. MACK.

Witnesses:
 WALTER ALLEN,
 W. E. ALLEN.